(12) United States Patent
Mukhtarov et al.

(10) Patent No.: US 11,747,501 B2
(45) Date of Patent: Sep. 5, 2023

(54) DISTRIBUTED ACOUSTIC SENSING: LOCATING OF MICROSEISMIC EVENTS USING TRAVEL TIME INFORMATION WITH HETEROGENEOUS ANISOTROPIC VELOCITY MODEL

(71) Applicant: Halliburton Energy Services, Inc., Houston, TX (US)

(72) Inventors: Timur Mukhtarov, Calgary (CA); Aleksandar Jeremic, Houston, TX (US); Henry Clifford Bland, Calgary (CA)

(73) Assignee: Halliburton Energy Services, Inc., Houston, TX (US)

( * ) Notice: Subject to any disclaimer, the term of this patent is extended or adjusted under 35 U.S.C. 154(b) by 114 days.

(21) Appl. No.: 17/284,017

(22) PCT Filed: Dec. 31, 2018

(86) PCT No.: PCT/US2018/068164
§ 371 (c)(1),
(2) Date: Apr. 9, 2021

(87) PCT Pub. No.: WO2020/142074
PCT Pub. Date: Jul. 9, 2020

(65) Prior Publication Data
US 2021/0382194 A1 Dec. 9, 2021

(51) Int. Cl.
*G01V 1/50* (2006.01)
*E21B 47/135* (2012.01)
(Continued)

(52) U.S. Cl.
CPC .............. *G01V 1/50* (2013.01); *E21B 43/121* (2013.01); *E21B 43/26* (2013.01); *E21B 47/135* (2020.05);
(Continued)

(58) Field of Classification Search
CPC ...... E21B 47/135; E21B 43/121; E21B 43/26; E21B 47/14; G01V 1/50; G01V 1/282;
(Continued)

(56) References Cited

U.S. PATENT DOCUMENTS

| | | |
|---|---|---|
| 7,660,199 B2 | 2/2010 | Drew |
| 9,075,155 B2 | 7/2015 | Luscombe et al. |

(Continued)

FOREIGN PATENT DOCUMENTS

WO   WO 2018/204920 A1   11/2018

OTHER PUBLICATIONS

International Search Report and The Written Opinion of the International Search Authority, or the Declaration, dated Sep. 26, 2019, PCT/US2018/068164, 11 pages, ISA/KR.

Ning et al., "Multicomponent Distributed Acoustic Sensing: Concept and Theory," *Geophysics*, vol. 83, No. 2, Mar.-Apr. 2018, pp. 1-8.

(Continued)

*Primary Examiner* — Elias Desta
(74) *Attorney, Agent, or Firm* — Kilpatrick Townsend & Stockton, LLP

(57) ABSTRACT

A fracture mapping system for use in hydraulic fracturing operations utilizing non-directionally sensitive fiber optic cable, based on distributed acoustic sensing, deployed in an observation well to detect microseismic events and to determine microseismic event locations in 3D space during the hydraulic fracturing operation. The system may include a weighted probability density function to improve the resolution of the microseismic event on the fiber optic cable.

20 Claims, 13 Drawing Sheets

(51) Int. Cl.
  *E21B 43/12*     (2006.01)
  *E21B 43/26*     (2006.01)
  *E21B 47/14*     (2006.01)
  *G01V 1/28*      (2006.01)
  *G01V 1/30*      (2006.01)

(52) U.S. Cl.
  CPC .............. *E21B 47/14* (2013.01); *G01V 1/282* (2013.01); *G01V 1/303* (2013.01); *G01V 1/306* (2013.01); *G01V 2210/626* (2013.01); *G01V 2210/6222* (2013.01)

(58) Field of Classification Search
  CPC .. G01V 1/303; G01V 1/306; G01V 2210/624; G01V 2210/626; G01V 2210/6222
  See application file for complete search history.

(56) References Cited

U.S. PATENT DOCUMENTS

| | | |
|---|---|---|
| 9,557,434 B2* | 1/2017 | Keller ................... E21B 47/16 |
| 2013/0298665 A1 | 11/2013 | Minchau |
| 2017/0038246 A1 | 2/2017 | Coates et al. |
| 2017/0260842 A1 | 9/2017 | Jin et al. |
| 2018/0119532 A1 | 5/2018 | Ma et al. |
| 2020/0271807 A1* | 8/2020 | Davies ................... G01V 1/006 |
| 2021/0318457 A1* | 10/2021 | Zheng ................... G01V 1/226 |

OTHER PUBLICATIONS

Webster et al., "Micro-Seismic Detection using Distributed Acoustic Sensing," *SEG Houston 2013 Annual Meeting*, pp. 2459-2463.

* cited by examiner

DISTRIBUTED ACOUSTIC SENSING: LOCATING OF MICROSEISMIC EVENTS USING TRAVEL TIME INFORMATION WITH HETEROGENEOUS ANISOTROPIC VELOCITY MODEL

PRIORITY

The present application is a U.S. National Stage patent application of International Patent Application No. PCT/US2018/068164, filed on Dec. 31, 2018, the benefit of which is claimed and the disclosure of which is incorporated herein by reference in its entirety.

FIELD OF THE DISCLOSURE

The present disclosure relates generally to hydraulic fracturing of a formation around a wellbore, and more specifically to determining the location of microseismic events and fracture mapping of the formation to enhance hydrocarbon recovery.

BACKGROUND

Microseismic data are often acquired in association with hydraulic fracturing treatments applied to a subterranean formation about a wellbore. The hydraulic fracturing treatments are typically applied to induce artificial fractures in the subterranean formation, and to thereby enhance hydrocarbon productivity of the subterranean formation. In a typical hydraulic fracturing treatment, fracturing treatment fluid is pumped via a treatment well into the formation at a pressure sufficiently high enough to cause new fractures or to enlarge existing fractures in the reservoir. Next, fracturing fluid carrying a proppant, such as sand, is pumped downhole into the treatment well. The proppant material remains in the fracture after the treatment is completed, where the proppant serves to hold the fracture open, thereby enhancing the ability of fluids to migrate from the formation to the wellbore through the fracture. The spacing between fractures, as well as the ability to stimulate fractures naturally present in the rock, may be major factors in the success of horizontal completions in unconventional hydrocarbon reservoirs. The pressures generated by the fracture treatment can induce low-amplitude or low-energy seismic events in the subterranean formation, and these events can be detected and collected for analysis. In a general aspect, dominant fracture characteristics in a subterranean zone are identified from microseismic data.

Improvements in recovery using fracking depend on fracture trajectories, net pressures, and spacing. Thus, the ability to monitor the geometry of the induced fractures to obtain optimal placement and stimulation is paramount. Therefore, what is needed in the art are improved methods of evaluating the hydraulic fracturing of a well being hydraulically stimulated. Although hydraulic fracturing is quite successful, even incremental improvements in technology can mean the difference between cost effective production and reserves that are uneconomical to produce.

Conventional microseismic mapping is performed with geophone tools deployed by wireline within a second well, called the observation well (as opposed to the treatment well) where the geophone tools are utilized to detect seismic events resulting from hydraulic fracturing about the treatment well. In other words, conventional microseismic mapping requires two wells—the treatment well for injection of the hydraulic fracturing fluid and the observation well within which the geophone equipment is deployed.

BRIEF DESCRIPTION OF THE DRAWINGS

For a more complete understanding of the present disclosure and the advantages thereof, reference is now made to the following brief description, taken in connection with the accompanying drawings and detailed description.

DESCRIPTION OF ILLUSTRATIVE EMBODIMENTS

Figure 1:
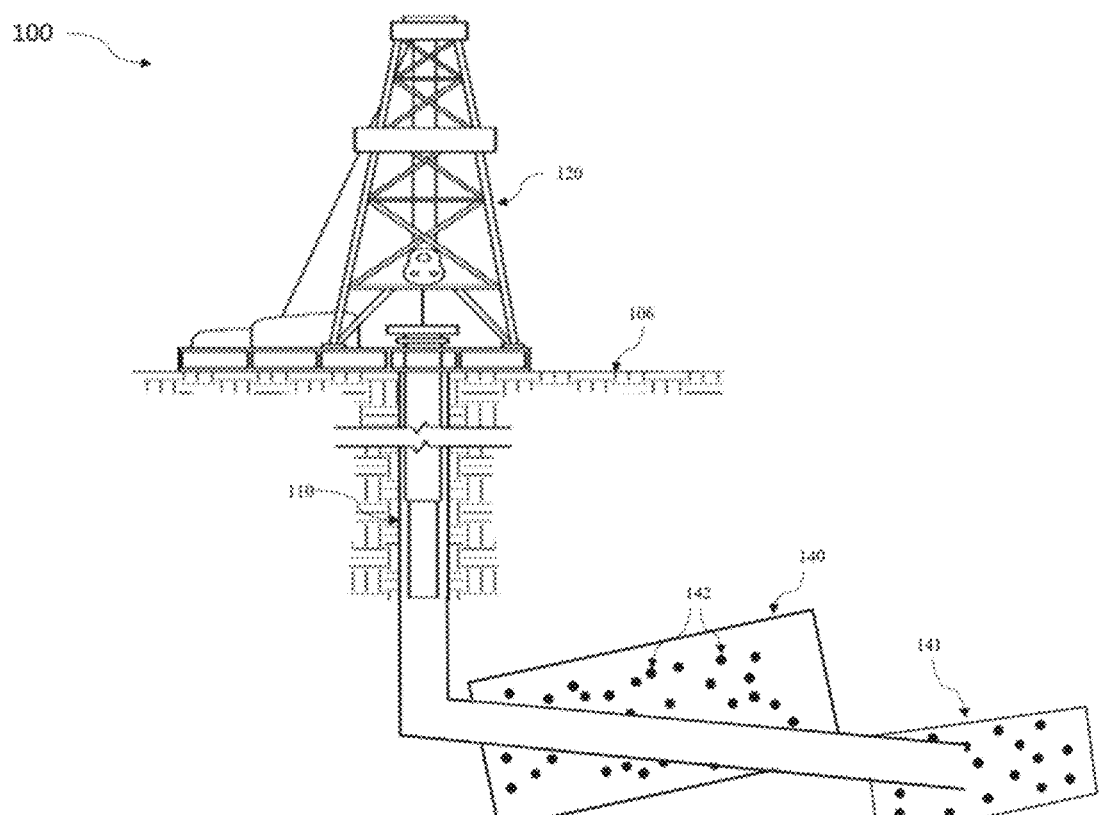
FIG. 1 depicts a hydrocarbon hydraulic fracture well system in accordance with one embodiment of the present disclosure.

This specification relates to using fiber optic cable deployed downhole in the treatment wellbore to detect microseismic events and use the resultant microseismic data to map fractures in the formation about the wellbore. Embodiments of the present disclosure utilize a fiber optic Distributed Acoustic Sensing (DAS) cable to achieve the same mapping result as geophones, but without the need to run tools into a second well. The present disclosure improves upon and enhances the quality of the received microseismic signals, through deployment of fiber optic DAS in the treatment well and subsequent data processing methodology, so that microseismic events can be located with a high degree of certainty in the vast majority of well deployment scenarios (lateral wellbores monitored with a single fiber). The present disclosure details a data-processing methodology that results in a substantial improvement in event location detection and mapping than competing methodologies.

Unlike conventional wireline-tool downhole microseismic logging, DAS microseismic data acquisition provides no direct measurement related to the directionality of the received seismic signals. Previous attempts to overcome this limitation have included use of either an L-shaped fiber optic deployment, more than one secondary observation well, or more than one fiber optic cable deployed within an observation well to uniquely resolve microseismic event locations when observed with DAS. However, these various DAS deployment techniques neglected to implement data related to the impact of the borehole profile and trajectory, surrounding formation rock characteristics, and spatial irregularities. Lack of implementation data associated with the above mentioned techniques could result in imprecise microseismic event location determination, increased event location uncertainty, and overall loss of fracture mapping resolution.

In the present disclosure more efficient and accurate means to detect microseismic even locations based on DAS are presented. Embodiments of the present disclosure generally relate to identification of microseismic event locations using DAS for fracture mapping. Drawbacks associated with traditional fiber optic DAS deployment downhole and/or the use of geophones for microseismic data acquisition are overcome through use of one or more of the following, either alone or in combination: (i) proper identification and characterization of the formation surrounding the fiber optic cable by determining the rock-velocity heterogeneity and rock-velocity anisotropy of the rock surrounding the fiber optic cable; (ii) utilizing spatial irregularities in well deviation in computation of travel times used in the determination of event locations; and (iii) applying variable weighting in the event-location probability-density function, therefore providing additional location-steering emphasis to portions of the fiber optic cable that fall outside the straight-line wellbore trajectory.

In some instances, these or other types of information are dynamically identified and displayed, for example, in a real-time fashion during a stimulation treatment. The stimulation treatment can include, for example, an injection treatment, a flow-back treatment, or another treatment. In some instances, the techniques described here can provide field engineers or others with a reliable and direct tool to visualize the stimulated reservoir geometry and treatment field development, to evaluate the efficiency of hydraulic fracturing treatments, to modify or otherwise manage a treatment plan, or to perform other types of analysis or design.

The present disclosure locates the source of subsurface seismic events using fiber optic DAS. Unlike conventional seismic location efforts that place emphasis on wavefront direction of the seismic sensing array, the DAS system has no such directional vector. Illustrative embodiments of the present disclosure circumvent the need for such directional sensitivity by utilization of raypath complexity arising from (1) multiple stratigraphic layers (2) wellbore complexity (3) length of sensing array. Compared to the length of a conventional geophone array used to measure microseismic events, the DAS array length is significantly longer. A longer DAS sensing array length allows for a larger aperture to capture incoming acoustic rays, further constraining the solution. Additionally, the inclusion of anisotropy in the stratigraphic layers can aid in the solution, providing greater certainty of the event locations.

The typical method of processing the microseismic event observed with distributed acoustic sensing is to assume a single-value (homogenous) velocity model. Given this model, a prior art method of location involves picking the depth along on the fiber where the arrivals arrive first. This yields an approximate event location at a position X along the fiber. By comparing the P-wave and S-wave arrival times, one can then compute a distance-to-event radius R. Having no way to resolve the direction of the event relative to fiber, the assumption is made in the prior art that the entire radius is due to a horizontal offset from the well. The event is plotted in map view at a distance "R" from the fiber, where R is measured in the direction of the frac well. This has two major drawbacks (1) the direction of the event (from the fiber) could be incorrect by 180 degrees and (2) some portion of the radius "R" is due to height growth of the frac, and not purely lateral growth. When the frac is imaged using this methodology, the result is that the frac length is overestimated and the frac-height is presumed to be zero (also incorrect). The folding of events from one side of the well, to the incorrect side of the well causes the resulting frac geometry to be poorly defined. It becomes impossible to measure an accurate fracture azimuth from mixture of correct and incorrectly-placed events.

In contrast to the above-described prior art method of processing a microseismic event, by representing the surrounding rock with a heterogeneous-anisotropic model, greater certainty in microseismic event locations is obtained. Using a homogeneous velocity model, where acoustic velocity doesn't vary with acoustic wave travel, direction doesn't add additional information with change in measurement depth of distributed sensor in terms of event depth resolution. For each distributed sensor, the solution space represents an identical uniprobable circle.

When anisotropy of the medium is utilized, acoustic velocity now changes with direction of wave propagation. Since the length of distributed cable provides variability in landing angles of acoustic waves with change in measurement depth, it affects velocities of observed arrivals and thus the solution space for each distributed sensor is different. Intersection of such solutions result in smaller a solution space with several local minima. If heterogeneity is added, variability in ray paths and travel times will increase, resulting in larger variability in solutions for each sensor in a smaller combined solution space. Using irregularities in wellbore path further increases this effect. Irregularities in borehole path, which are inherent to the drilling of horizontal wells, help to minimize location uncertainty further and the application of weighting aids in the selection of correct microseismic event locations in 3D space.

Weighting is applied to add extra emphasis to seismic observations that come from portions of the fiber optic cable that are positioned within wellbore-trajectory excursions. Wellbore trajectory excursions are places where the wellbore does not follow a perfectly straight line through the subsurface but undulates up/down/sideways before continuing on its path to the well target. The weight is unique for each position along the fiber, where the weight factors—in the perpendicular distance between the actual wellbore, and the idealized (perfectly linear) wellbore trajectory.

The heterogeneous-anisotropic model is comprised of stratigraphic layers. Layers can be horizontal or dipping. Height of the layers can be constant or varying laterally. Layers can have vertical transverse isotropy (VTI), tilted transverse isotropy (TTI), horizontal traverse isotropy (HTI) or orthorhombic acoustic anisotropy.

Idealized wellbore trajectory can be found by fitting a line in a portion of actual wellbore trajectory with DAS fiber using orthogonal distance regression. If $X=[\ldots x_j \ldots]$—matrix where each column represents east, north and depth coordinates of each distributed sensor $x_j=[e_j\ n_j\ d_j]^T$, m is average of column space of X and $A=X-m[\ldots 1 \ldots]^T$ represents sensor coordinates relative to m, let $\lambda_1 \leq \lambda_2 \leq \lambda_3$ to be eigenvalues of $AA^T$; then, eigenvector v corresponding to $\lambda_3$ and centroid M will define idealized, perfectly linear well trajectory. Perpendicular distance between idealized wellbore and distributed sensor j can be found as a length of vector $r_j = a_j - vv^T a_j$, where $a_j$—j column of matrix A representing coordinates of that sensor relative to m In one or more embodiments, lateral variations of rock parameters may be utilized, where rock properties are not constrained to flat-layer stratigraphy. The inclusion of later variations of rock parameters introduces more complexity into the model and thus even more variability in travel times with event location and position of distributed sensor, further constraining the solution.

The wavefield of seismic energy, released from a microseismic event, include a compressional wave (P-wave) and a shear wave (S-wave). Depending on the interaction between the seismic raypath and the stratigraphy around the well, these P-waves and S-waves can be received by the acoustic sensing cable as direct waves, reflected waves, and refracted waves. The arrival times of the P-waves and S-wave can be measured at points along the acoustic sensing cable. Given these arrival times, and an understanding of the rock properties (specifically the seismic velocity and velocity-anisotropy) in the region around the acoustic sensing cable, the source-location of the microseismic event can be computed. Only certain source-locations will create the P-wave and S-wave arrival times that are observed by the acoustic sensing cable. Computation of the most likely source-locations is performed. After considering, potentially thousands, of source-locations, the best-matching source-location (or locations) are found. The method can use P-wave, single S-wave or multiple S-wave modes resulting from shear wave splitting. The method can also be applied to any combinations of the above-mentioned waves by utilizing the arrivals of those waves and analyzing the differences between theoretical values and observed values since different waves exhibit different degrees of variability with angle and the combination of the different waves leads to a constrained solution. In addition to the above, combination of first and direct arrivals can be utilized, as well as reflections, further improving resolution in event locations.

One way to find event location is to precompute theoretical travel time for each receiver and potential event location in three dimensional grid, then for each grid point compare theoretical travel times and observed travel times and find grid location that has maximum of probability density function (PDF) based on travel time residuals. Travel time residual $$t_i^{res} = \sqrt{\frac{\sum_j^N (t_j^{obs} - t_i^0 - t_{ij}^{mod})^2}{N}}, \quad (1)$$

$$t_i^0 = \frac{\sum_j^N (t_j^{obs} - t_{ij}^{mod})}{N}, \quad (2)$$

is an estimate of event origin time, i—grid index, j—pick index, N—total number of picks for a given event. Probability density function $$pdf(t) \propto e^{-\frac{1}{2}\left(\frac{t_i^{res}}{\sigma_t}\right)^2}, \quad (3)$$

$$\sigma_t = \min_i t_i^{res}. \quad (4)$$

The maximum of the PDF will correspond to the most probable event location.

An alternative to find location and origin time of the event is through least-squares solution and/or imaging (migration) methods. As the acquired data (d) is linearly dependent on a source function (f), containing information about an event location and origin time, that is, d=Gf, where G is a linear operator, called Green's function, the source function can be solved by least-squares solution, that is, through normal equation:

$$f = (G^*G)^{-1} G^* d. \quad (5)$$

Assuming assume that normal operator is $(G^*G)^{-1} = \alpha I$, one can simplify the solutions $f \approx \alpha G^* d$, usually called imaging or migration solution. Once the source function is estimated through least-squares or migration, the maximum of the $\|f\|$ defines the most probable location and origin time of the event:

$$x, t_0 = \underset{x,t}{\operatorname{argmax}} \|f\| \quad (6)$$

While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Illustrative embodiments and related methodologies of the present disclosure are described below in reference to FIGS. 1-12 as they might be employed, for example, in methods for hydraulic fracturing utilizing microseismic signal acquisition.

FIG. 1 is an illustration of a diagram of a well system 100 to be hydraulically fractured. Determining the location and orientation of subsurface fractures is important information for the well operation plan. Well system 100 includes well equipment 120 located at a surface location 106. A borehole 110 extends from surface location 106 down into a formation. In the illustrated embodiment, well system 100 is a treatment well, whereby well equipment 120 is communicatively coupled with borehole 110. In one or more embodiments, well equipment 120 may also include one or more hydraulic fracturing pumps coupled to one or more hydraulic fracturing fluid sources (not shown) for hydraulic fracturing operations in borehole 110, while in other embodiments, well equipment 120 may also include one or more pumps coupled to one or more fluid sources (not shown) for injection of treatment fluids such as chemicals into borehole 110 for a particular treatment operation, such as acidizing. In some embodiments where hydraulic fracturing operations are occurring, the fluid source is a hydraulic fluid source and the pump is a high pressure hydraulic fluid pump. In other embodiments, the fluid source may provide acidizing fluid for acidizing operations. FIG. 1 illustrates two hydraulic fractures 140 and 141 in formation about borehole 110. Hydraulic fractures 140, 141 are assumed to be bi-wing; only one wing is drawn in the example well system 100. The fracture geometry of each of the hydraulic fractures 140 and 141 are calculated using the detection of microseismic events, such as microseismic events 142. Microseismic events 142, when viewed collectively, form a microseismic event cloud from which the fracture geometry of hydraulic fracture 140 can be calculated as a planar fracture fit into an event cloud for a given stage.

Figure 2:
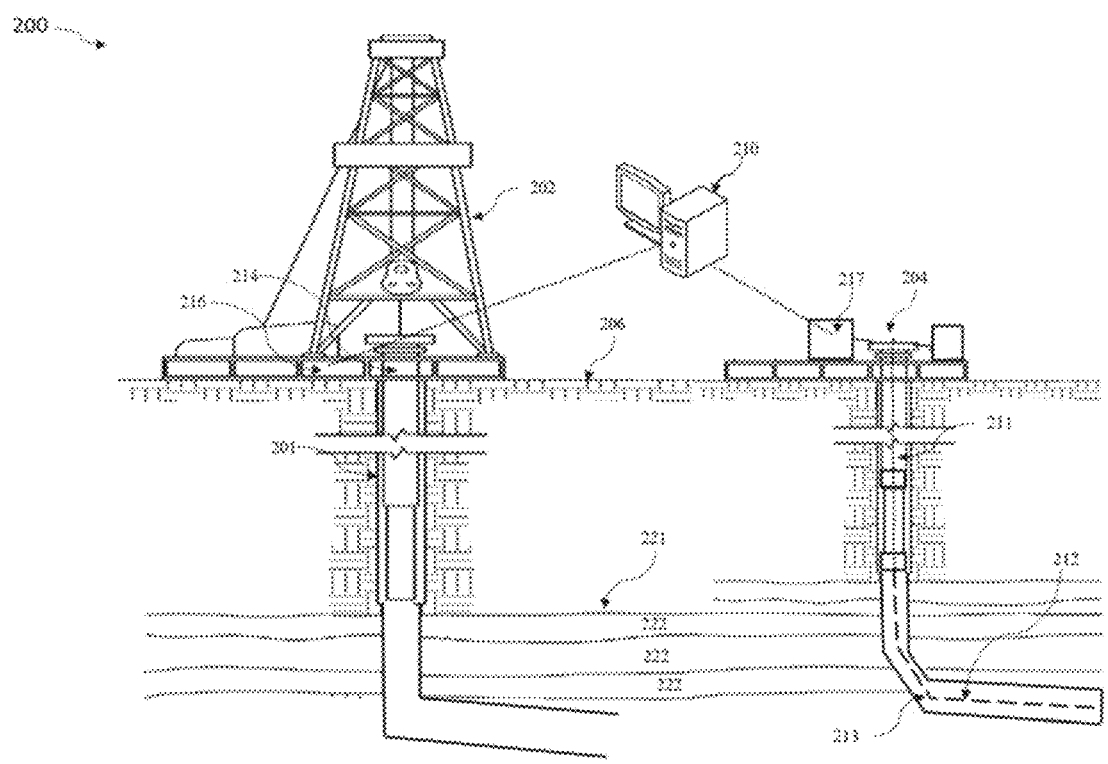
FIG. 2 depicts a system hydraulic fracture system with an offset well monitoring system.

FIG. 2 illustrates a system diagram of an example offset-well monitoring system 200. The example offset-well monitoring system 200 includes a treatment well 202, i.e., a well into which hydraulic fracture fluid is injected, and an observation well 204. In proximity to treatment well 202 is a well system controller 216 and injection fluid pump system 214. Treatment well 202 includes a borehole 201 extending beneath a surface 206 into formation. Observation well 204 includes a borehole 211 extending down from surface 206 into formation and an acoustic sensing controller 217. Disposed within borehole 211 is at least one acoustic sensing cable 212 communicatively and optically coupled to acoustic sensing controller 217. In some embodiments, only a single acoustic sensing cable 212 is positioned along borehole 211. Offset-well monitoring system 200 also includes a computing subsystem 210, communicatively coupled to well system controller 216 and acoustic sensing controller 217. The acoustic sensing cable 212 can be located in a portion of the borehole 211, or the entire length of borehole 211.

The observation well 204 can be located spaced apart from and remote from the treatment well 202, near the treatment well 202, or at another suitable location, as long as acoustic sensing cable 212 in observation well 204 can detect the microseismic events generated in treatment well 202. Borehole 211 can, but does not need to, include a bend from a generally vertical orientation to a generally horizontal orientation, identified as heel 213.

The offset-well monitoring system 200 can include one or more additional treatment wells, observation wells, and other well systems. The computing subsystem 210 can include one or more computing devices or systems located at the treatment well 202, at the observation well 204, or in other locations. The computing subsystem 210, and one or more sub-components, can be located apart from the other components shown in diagram 200. For example, the computing subsystem 210 can be located at a data processing center, a computing facility, and other suitable locations.

The offset-well monitoring system 200 can include additional or different features, and the features of the offset-well monitoring system 200 can be arranged as shown in diagram 200 and in other suitable configurations. In the example borehole 201 of treatment well 202 extends into a subsurface zone 221 in formation. In the example shown, the subsurface zone 221 includes various subsurface layers 222. The subsurface layers 222 can be defined by geological or other properties of the subsurface zone 221.

The well system controller 216 and pump 214 are utilized to execute a plan to apply a fluid treatment to the subsurface zone 221 through the borehole 201. The injection treatment can be a hydraulic fracturing treatment that fractures the subsurface zone 221. For example, the injection treatment may initiate, propagate, or open fractures in one or more of the subsurface layers 222. A fracture treatment may include a mini fracture test treatment, a regular or full fracture treatment, a follow-on fracture treatment, a re-fracture treatment, a final fracture treatment, and other fracture treatments. The fracture treatment can pump in an injection fluid into, or pump out an injection fluid out of, the subsurface zone 221 at any suitable fluid pressure and fluid flow rate. Injection fluids can be pumped above, at, or below a fracture initiation pressure, above, at, or below a fracture closure pressure, or at other suitable combinations of these and other injection fluid pressures. A fracture treatment can be applied by any appropriate system, using any suitable technique.

The fracture treatment, as well as other activities and natural phenomena, can generate microseismic events in the subsurface zone 221, and microseismic data can be collected from the subsurface zone 221. For example, the microseismic data can be collected by a single acoustic sensing cable 212 inserted in observation well 204. The microseismic information detected in the offset-well monitoring system 200 can include acoustic/seismic waves generated by natural phenomena, acoustic/seismic waves associated with a fracture treatment applied through the treatment well 202, or other seismic waves. For example, the acoustic sensing cable 212 can detect acoustic/seismic waves generated by rock slips, rock movements, rock fractures, and other snap, crackle, and pop events in the subsurface zone 221. Microseismic events in the subsurface zone 221 can occur, for example, along or near induced hydraulic fractures. The microseismic events can be associated with pre-existing natural fractures or hydraulic fracture planes induced by fracturing activities. In some environments, the majority of detectable microseismic events can be associated with shear-slip rock fracturing. Such events can correspond to induced tensile hydraulic fractures that have significant width generation.

The computing subsystem 210 can include a processor and analyzer component capable of analyzing microseismic data collected in the offset-well monitoring system 200. For example, the computing subsystem 210 can analyze microseismic data from a fracture treatment of the subsurface zone 221. Microseismic data from a fracture treatment can include data collected before, during, and after fluid injection. The computing subsystem 210 can receive the microseismic data at any suitable time. In some instances, the computing subsystem 210 receives the microseismic data in real time (or substantially in real time) during the fracture treatment. For example, the microseismic data may be sent to the computing subsystem 210 immediately upon detection by the acoustic sensing cable 212. In some instances, the computing subsystem 210 receives some or all of the microseismic data after the fracture treatment has been completed.

The computing subsystem 210 can receive the microseismic data in various suitable formats. For example, the computing subsystem 210 can receive the microseismic data in a format produced by microseismic sensors or detectors, or the computing subsystem 210 can receive the microseismic data after the data has been formatted, packaged, or otherwise processed. The computing subsystem 210 can receive the microseismic data by any suitable means. For example, the computing subsystem 210 can receive the microseismic data by a wired or wireless communication link, by a wired or wireless network, or by one or more disks or other tangible media.

Some of the techniques and operations described herein may be implemented by a computing subsystem 210 configured to provide the functionality described. In various aspects, a computing device may include various types of devices, including, but not limited to, personal computer systems, desktop computers, laptops, notebooks, mainframe computer systems, handheld computers, workstations, tablets, application servers, storage devices, cloud data centers, or other types of computing or electronic devices.

Figure 3:
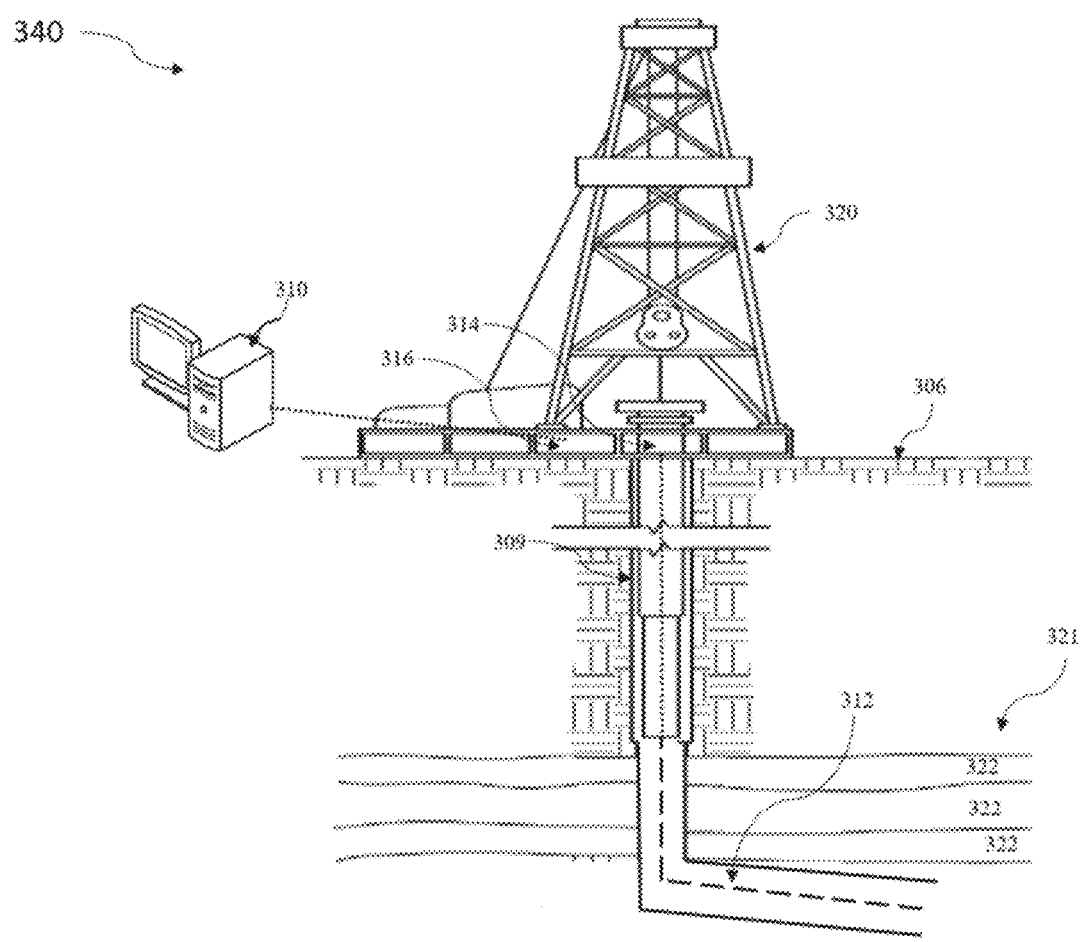
FIG. 3 depicts a same-well monitoring system with a single DAS system deployed.

FIG. 3 illustrates an embodiment of a well monitoring system 340 utilizing a at least one acoustic sensing system disposed in the same well in which treatment fluid is injected. Similar to diagram 200, diagram 340 includes a well system 320, a well system controller 316, an injection fluid pump controller 314, a computing sub-system 310, a borehole 309 extending down from surface 306 into a formation, and single acoustic sensing cable 312. In this embodiment, an acoustic sensing controller 317 is included in the well system controller 316. In alternative aspects, acoustic sensing controller 317 can be a separate component. In this embodiment of well monitoring system 340, the treatment well and the observation well are the same borehole. The operation of the well system is similar to that of diagram 200.

Figure 4:
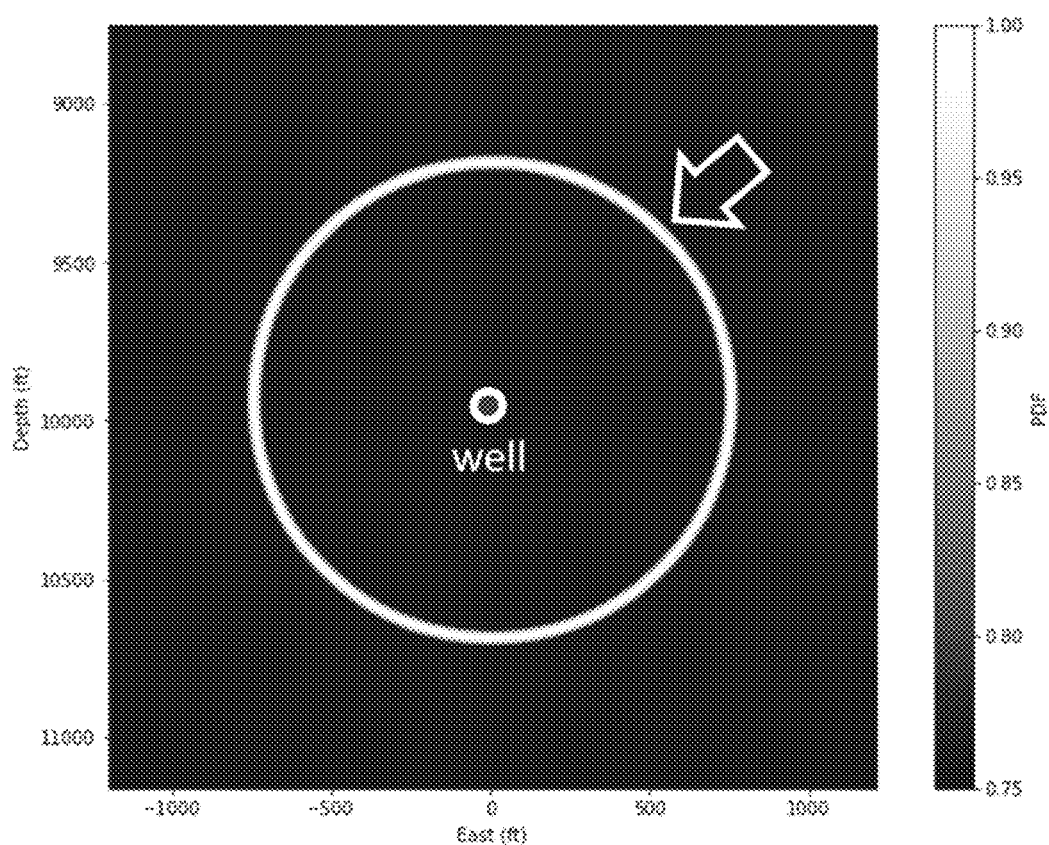
FIG. 4 is a probability density function for an event observed on DAS fiber.
Figure 5:
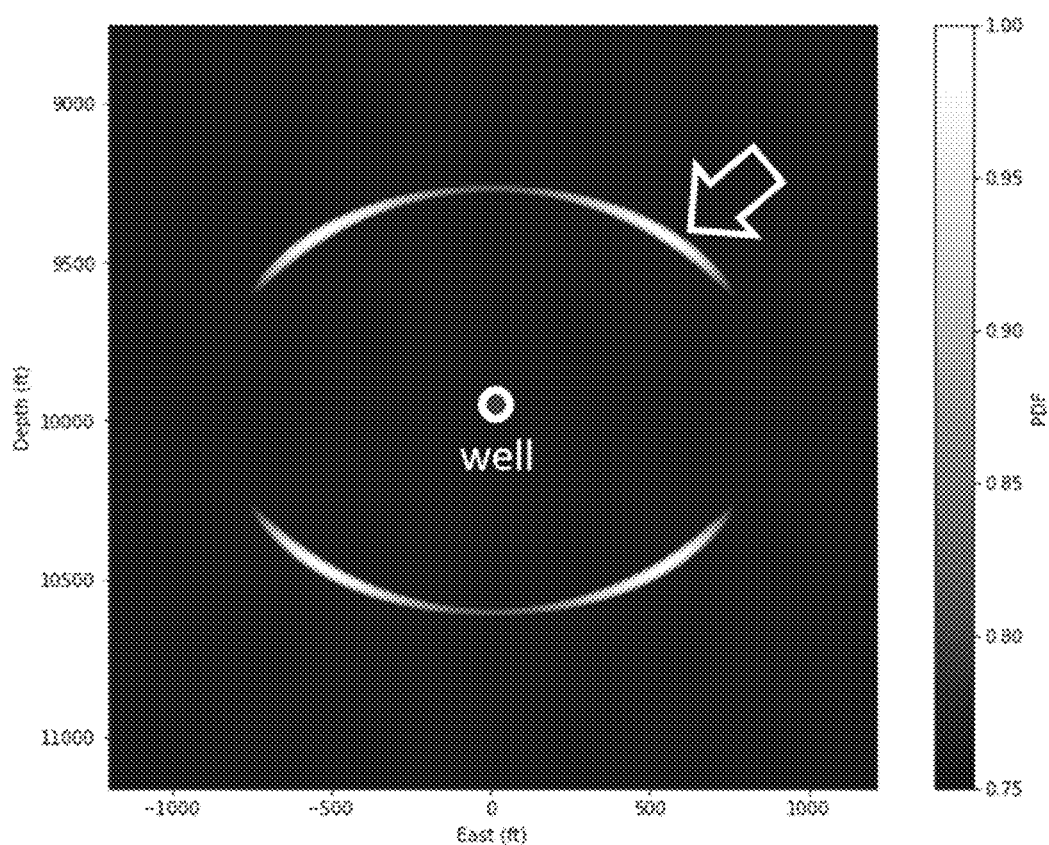
FIG. 5 is a probability density function with the medium including velocity anisotropy.
Figure 6:
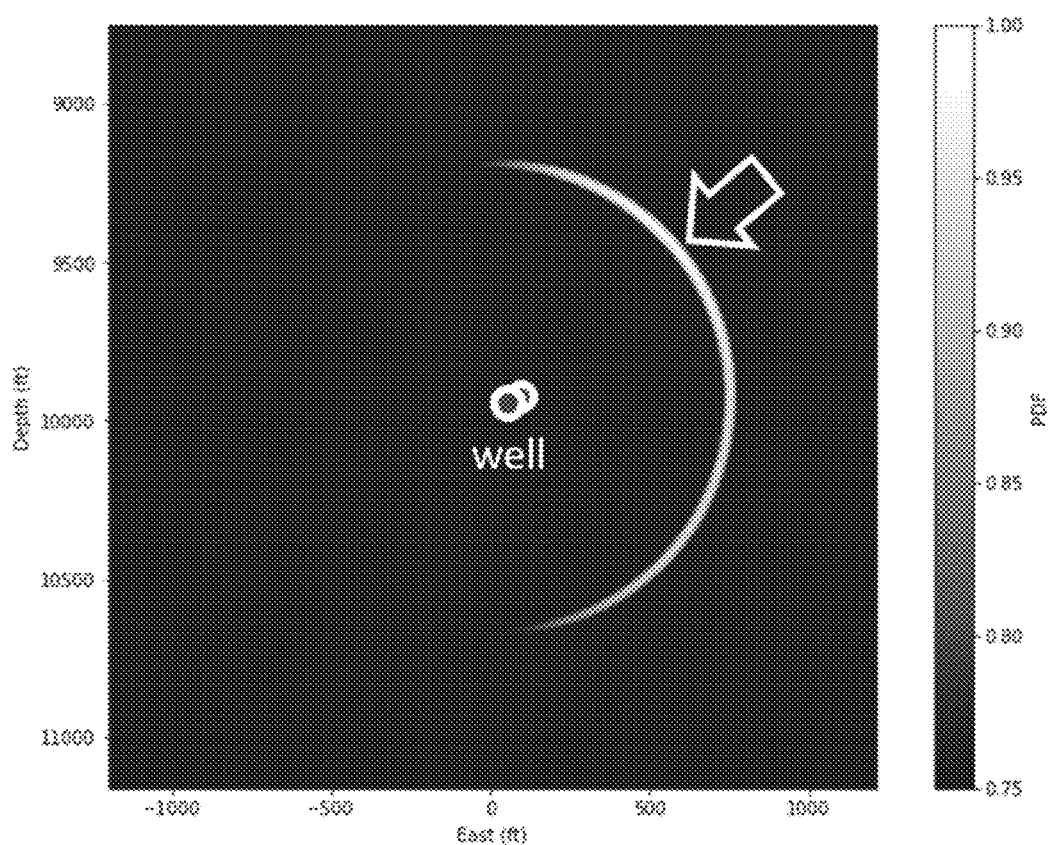
FIG. 6 is a probability density function for an event observed on DAS fiber optic in slightly deviated well.
Figure 7:
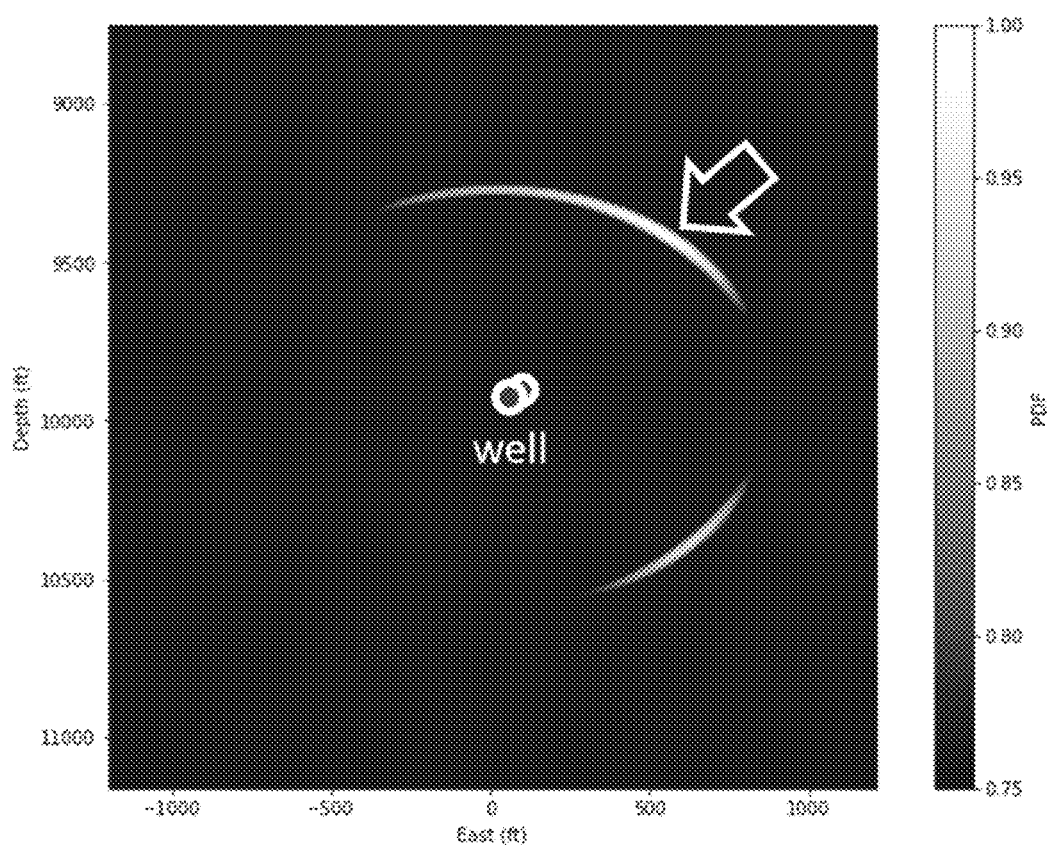
FIG. 7 shows the combination of the weighted wellbore-undulation factor along with the homogeneous anisotropic velocity constraining the probability density function to a small solution space.
Figure 8:
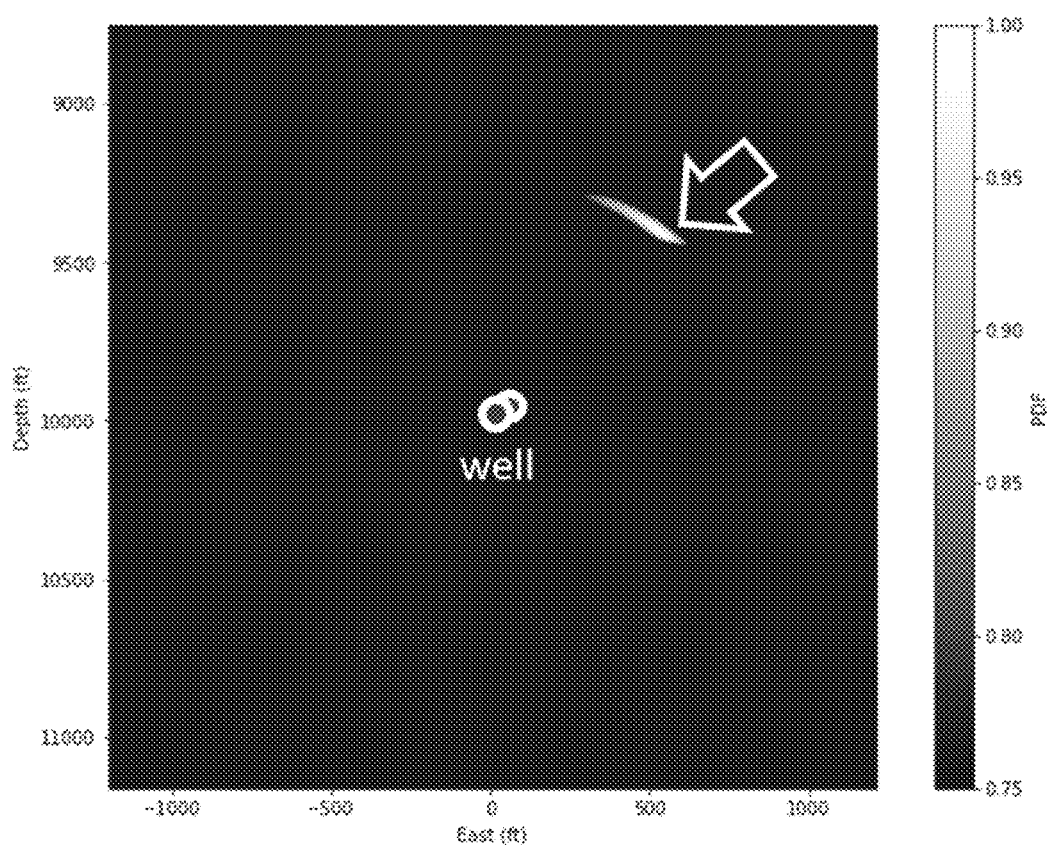
FIG. 8 shows the location of the microseismic event in 3D space using non-directionally sensitive fiber optic cable.
Figure 9:
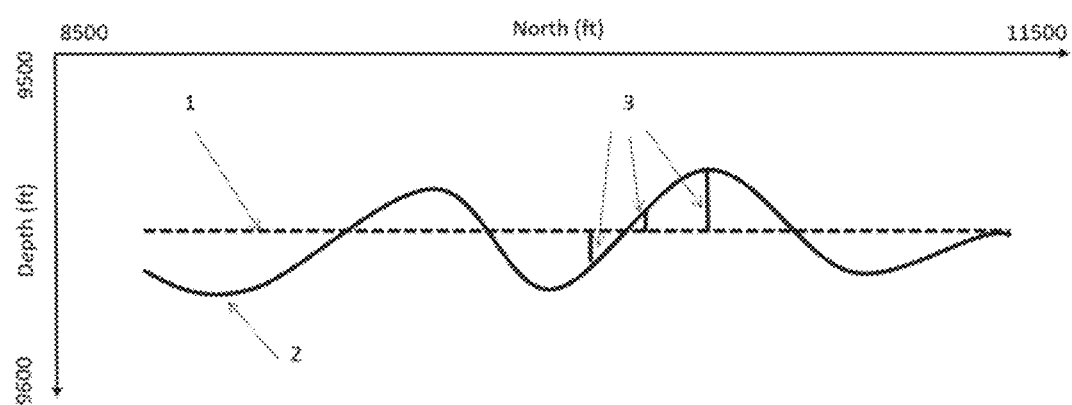
FIG. 9 shows an idealized lateral wellbore and an actual, true (undulating) lateral wellbore.

FIG. 4 shows the probability density function event observed on DAS fiber on a strictly horizontal well in homogenous isotopic medium in axial (gun-barrel) view. The arrow points to a modelled event location. All points along a ring of 3-D space have equal probability, so a unique event location cannot be resolved. FIG. 5 shows the probability density function if the medium is modelled with velocity anisotropy. The probability density function now highlights four potential event locations, each with equal likelihood of being correct. FIG. 6 shows the probability density function for an event observed on the DAS fiber for a slightly deviated horizontal well in homogenous isotopic medium. When taken into consideration, irregularities in the wellbore path result in a reduction of the solution space where an event is most likely located. The solution becomes more resolved as the amplitude of the wellbore undulations increases. Obviously, the wellbore undulations cannot be increased once the well is drilled, however, the strength of the solution can be enhanced through the application of a weighting which places more emphasis on parts of the well which fall off the ideal wellbore trajectory. FIG. 7 shows the probability density function when the weighted wellbore undulation factor is combined with the homogeneous anisotropic velocity model. The probability density function is constrained to a relatively small solution space. Although FIG. 7 is close to a final solution, there is another enhancement that can be implemented. FIG. 8 shows a solution when the medium is changed from a homogenous anisotropic medium to a heterogeneous anisotropic medium. When combined with the weighted wellbore deviations factor, it allows unambiguous resolution of the event location with greatly improved reduction in uncertainty. In FIG. 8, the arrow points to the location where the microseismic event was synthesized and the probability density function now highlights the same location in space. This shows that the methodology used can locate the microseismic event in 3D space using a non-directionally sensitive fiber. FIG. 9 shows a schematic of an idealized lateral wellbore 1 and an actual, true (undulating) lateral wellbore 2. The weight applied to the measurements in the fiber running alongside the wellbore 2 is a function of the magnitude of the wellbore undulation. The arrows originating from 3 in FIG. 9 indicates the perpendicular distance from the true wellbore to the idealized wellbore.

Figure 10:
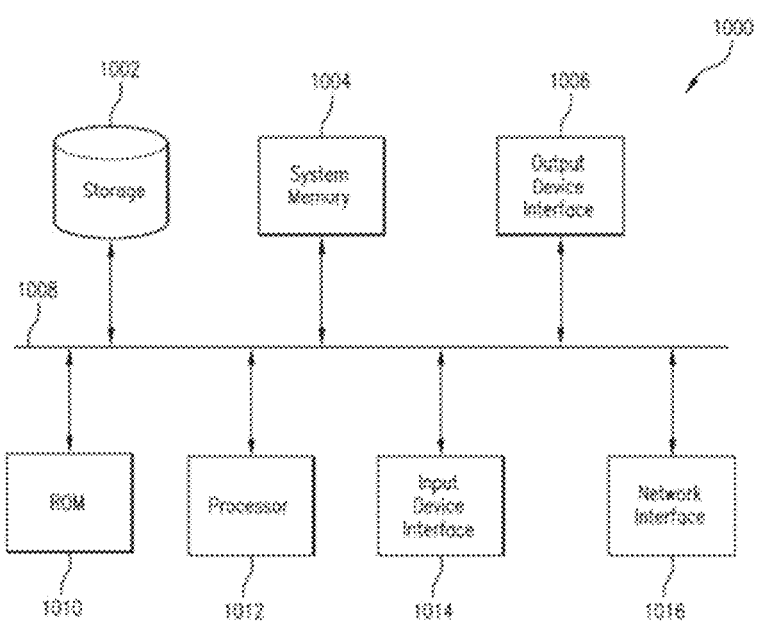
FIG. 10 is a block diagram of an illustrative computer system in which embodiments of the present disclosure may be implemented.

FIG. 10 is a block diagram of an exemplary computer system 1000 in which embodiments of the present disclosure may be implemented. In one or more embodiments, computer system 1000 may be the computing sub-system 210 of FIG. 2 or the computing sub-system 310 of FIG. 3 (or data processing components thereof). In one or more embodiments, computer system 1000 may be the computing sub-system for any of the sub-systems of systems 1100 and 1200 of FIGS. 11 and 12. System 1000 can be a computer, phone, PDA, or any other type of electronic device. Such an electronic device includes various types of computer readable media and interfaces for various other types of computer readable media. As shown in FIG. 10, system 1000 includes a permanent storage device 1002, a system memory 1004, an output device interface 1006, a system communications bus 1008, a read-only memory (ROM) 1010, processing unit(s) 1012, an input device interface 1014, and a network interface 1016.

Bus 1008 collectively represents all system, peripheral, and chipset buses that communicatively connect the numerous internal devices of system 1000. For instance, bus 1008 communicatively connects processing unit(s) 1012 with ROM 1010, system memory 1004, and permanent storage device 1002.

From these various memory units, processing unit(s) 1012 retrieves instructions to execute and data to process in order to execute the processes of the subject disclosure. The processing unit(s) can be a single processor or a multi-core processor in different implementations.

ROM 1010 stores static data and instructions that are needed by processing unit(s) 1012 and other modules of system 1000. Permanent storage device 1002, on the other hand, is a read-and-write memory device. This device is a non-volatile memory unit that stores instructions and data even when system 1000 is off. Some implementations of the subject disclosure use a mass-storage device (such as a magnetic or optical disk and its corresponding disk drive) as permanent storage device 1002.

Other implementations use a removable storage device (such as a floppy disk, flash drive, and its corresponding disk drive) as permanent storage device 1002. Like permanent storage device 1002, system memory 1004 is a read-and-write memory device. However, unlike storage device 1002, system memory 1004 is a volatile read-and-write memory, such a random access memory. System memory 1004 stores some of the instructions and data that the processor needs at runtime. In some implementations, the processes of the subject disclosure are stored in system memory 1004, permanent storage device 1002, and/or ROM 1010. For example, the various memory units include instructions for computer aided pipe string design based on existing string designs in accordance with some implementations. From these various memory units, processing unit(s) 1012 retrieves instructions to execute and data to process in order to execute the processes of some implementations.

Bus 1008 also connects to input and output device interfaces 1014 and 1006. Input device interface 1014 enables the user to communicate information and select commands to the system 1000. Input devices used with input device interface 1014 include, for example, alphanumeric, QWERTY, or T9 keyboards, microphones, and pointing devices (also called "cursor control devices"). Output device interfaces 1006 enables, for example, the display of images generated by the system 1000. Output devices used with output device interface 1006 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 10, bus 1008 also couples system 1000 to a public or private network (not shown) or combination of networks through a network interface 1016. Such a network may include, for example, a local area network ("LAN"), such as an Intranet, or a wide area network ("WAN"), such as the Internet. Any or all components of system 1000 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, systems 1100 and 1200 of FIGS. 11 and 12, respectively, as described below, may be implemented using system 1000 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

Figure 11:
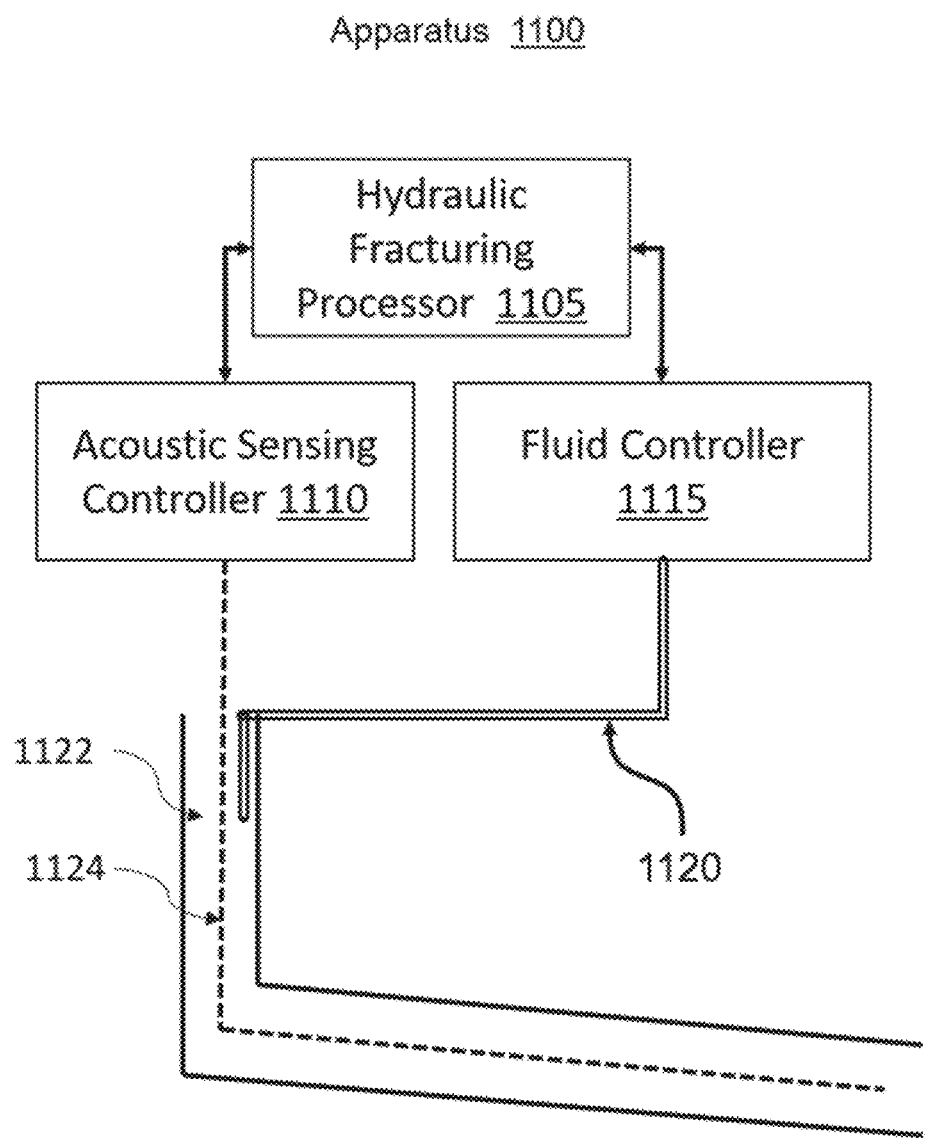
FIG. 11 is an illustration of a at least one acoustic cable apparatus for a well system capable of initiating a fluid treatment and detecting microseismic events from the same well.

FIG. 11 is an illustration of a diagram of an example single linear acoustic cable apparatus 1100 for a same-well system, capable of initiating a HF and detecting microseismic events. The apparatus also applies to an offset-well system. Apparatus 1100 includes a borehole 1122, a single acoustic sensing cable 1124, a HF processor 1105, an acoustic sensing controller 1110, a fluid controller 1115, and a fluid pipe 1120. HF processor 1105 can be one or more components capable of receiving commands and data, and sending instructions and information to other systems. HF processor 1105 can be communicatively coupled to an acoustic sensing controller 1110 and fluid controller 1115. HF processor 1105 can instruct the controllers 1110 and 1115 to execute commands and to collect data.

Acoustic sensing controller 1110 is optically, electrically, or communicatively coupled to single acoustic sensing cable 1124. For optical sensing systems, acoustic sensing controller 1110 can initiate a light source to generate an optical signal through single acoustic sensing cable 1124 and to receive a return optical signal through single acoustic sensing cable 1124. For electrical sensing systems, acoustic sensing controller 1110 can supply power to acoustic sensors within the acoustic sensing cable 1124 and receive a return electrical or communicative readings from the sensors within the cable. Single acoustic sensing cable 1124 can be one or more of a general single acoustic sensing cable, a coherent Rayleigh interrogator cable, cable coated or treated with a material to enhance acoustic sensitivity, cable containing fiber Bragg grating reflectors, and cable including other enhancements and sensors to improve detection capabilities. Single acoustic sensing cable 1124 may also contain discrete acoustic sensing sensors such as hydrophones.

Fluid controller 1115 is connected to fluid pipe 1120. Fluid pipe 1120 extends partially or fully into borehole 1122. Fluid controller 1115 is capable to pump injection fluid into, and out of, borehole 1122 or a portion/section of borehole 1122. Fluid controller 1115 is also capable of changing the injection fluid pressure.

The components of apparatus 1100 can be combined or separated into one or more components. For example, in an alternative aspect, acoustic sensing controller 1110 can be combined with HF processor 1105. Other combinations are possible as well.

Figure 12:
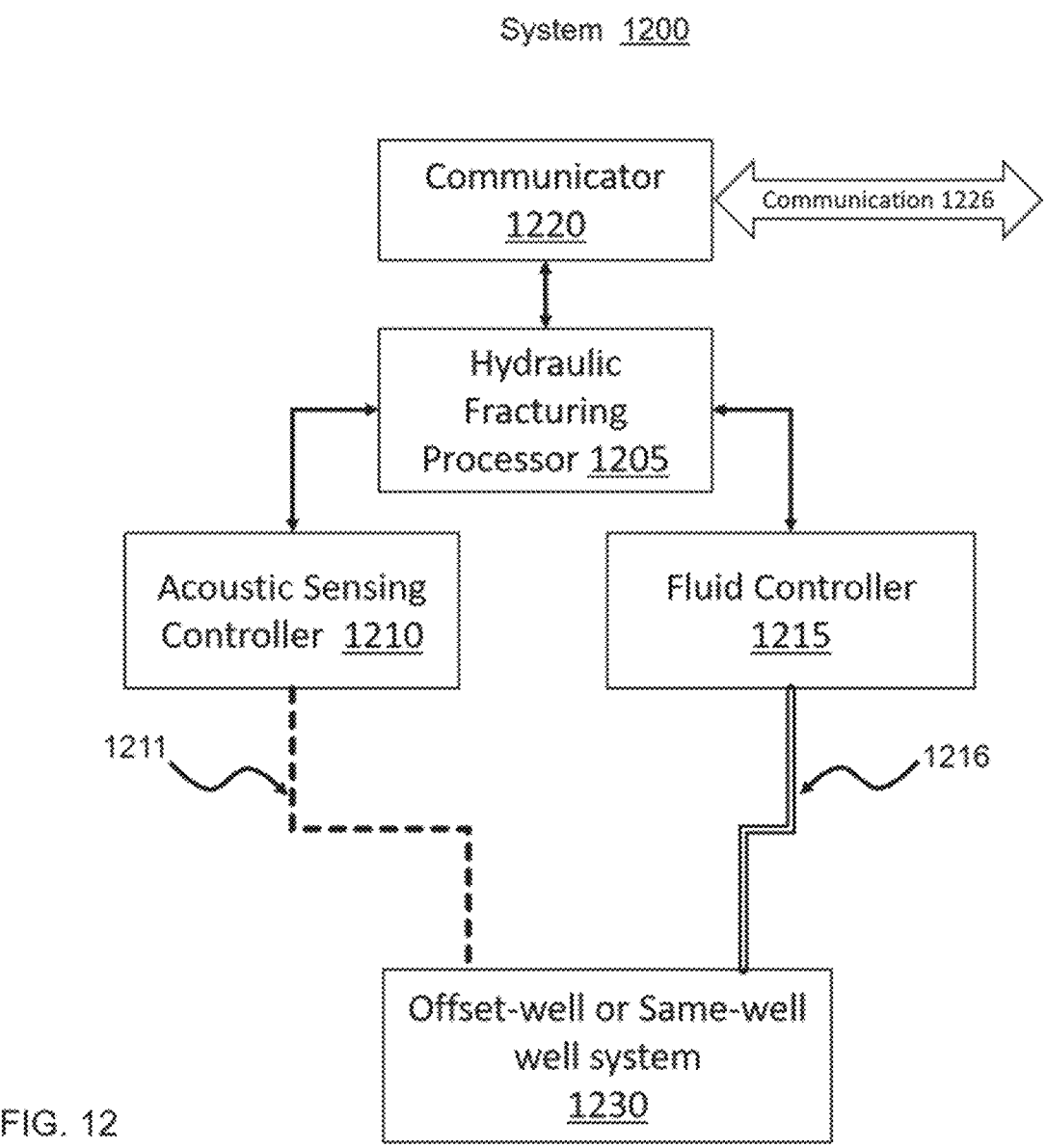
FIG. 12 is an illustration of a at least one acoustic sensing cable system for detecting microseismic events arising from a fluid treatment process in a well.

FIG. 12 is an illustration of a diagram of an example single acoustic sensing cable system 1200, operable to execute a HF process. System 1200 includes a HF processor 1205, acoustic sensing controller 1210, fluid controller 1215, communicator 1220, and a well system 1230. The components described can be combined or separated into one or more components, for example, in some aspects, the acoustic sensing controller 1210 and communicator 1220 can be combined with HF processor 1205, or these components can be included in a computing sub-system. Other combinations are possible as system 1200 demonstrates one possible implementation of the system functionality. HF processor 1205 and communicator 1220 can be partially or fully represented by the computing subsystem 210, shown in FIG. 2A.

HF processor 1205 can provide commands, instructions, and information to the other components, as well as receive data and information. Acoustic sensing controller 1210 can receive commands and instructions from HF processor 1205 and can control and generate a light source. Acoustic sensing controller 1210 can be optically connected to single sensing cable 1211 and its light source can be utilized to send optical signals through the cable 1211. Cable 1211 can be inserted into a borehole that is part of well system 1230. Acoustic sensing controller 1210 can also receive optical signals from cable 1211. Alternatively, acoustic sensing controller 1210 can receive electrical measurements from discrete electronic acoustic sensors within the cable 1211. Acoustic sensing controller 1210 can interpret the received signals and communicate the interpreted information to HF processor 1205. Alternatively, acoustic sensing controller 1210 can communicate a digital signal, utilizing the received optical or electrical signal, to the HF processor 1205, where the digital signal data is communicating the received optical or electrical signal data.

Fluid controller 1215 can be fluidly connected to fluid pipe 1216 and communicatively coupled to HF processor 1205. Fluid pipe 1216 can extend from the fluid controller 1215 and be inserted partially or fully into a borehole that is part of well system 1230. Well system 1230 can comprise of one or more boreholes. Single sensing cable 1211 and fluid pipe 1216 can be inserted into the same or different borehole. Fluid controller 1215 can control injection fluid parameters, such as, how the injection fluid is pumped into, and out of, the borehole, the temperature of the injection fluid, the pressure applied to the injection fluid pumping action, and other parameters.

As acoustic sensing controller 1210 collects the received microseismic event source-locations from single sensing cable 1211, acoustic sensing controller 1210 can communicate the information in real-time, near real-time, delayed time, and in batch mode to hydraulic fracturing processor 1205. HF processor 1205 can utilize this information to adjust the commands and instructions issued to the other components. In some aspects, the HF processor 1205 can be supplemented by a human operator to assist in interpreting the collected source-locations.

HF processor 1205 can utilize the microseismic event source-locations collected to calculate fracture geometry parameters. There can be one or more sets of fracture geometry parameters. For example, there can be two or more fractures in the subsurface formation that generate microseismic events, and various combinations of subsets of source-locations can be utilized, such as computed attributes, derived attributes, and operational plan phases. This analyzed information can be communicated by HF processor 1205 to communicator 1220.

Communicator 1220 can be communicatively coupled, through communication 1226, to one or more of a computing device (computer, laptop, mobile device, server, and other device types), a network (private network, public network, Ethernet, TCP/IP, and other types of networks), a data storage system (database, hard disk, memory device, cloud storage, and other data storage device types), a display device (monitor, printer, and other display device types), and other electronic equipment (other well system controllers, equipment, and other well system associated devices).

Figure 13:
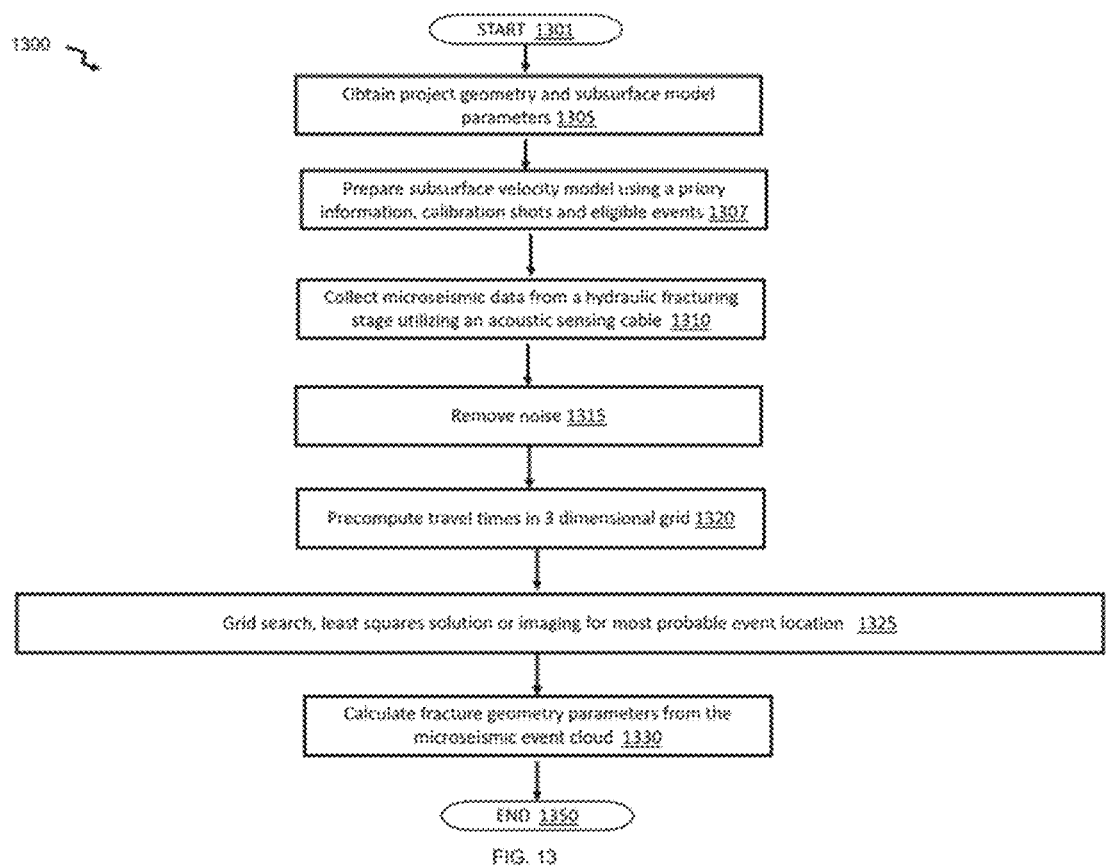
FIG. 13 is an illustration of a flow chart describing the processing steps in which embodiments of the present disclosure may be implemented.

FIG. 13 is an illustration of a flow chart describing the processing steps in which embodiments of the present disclosure may be implemented. 1301 indicates the start of the process. Step 2 the project geometry and subsurface model parameters are obtained. step 3 consists of preparing the subsurface velocity model using a priory information, calibration shots and eligible events. At step 4 microseismic data is then collected from a hydraulic fracturing stage utilizing an acoustic sensing cable. After removal of noise at step 5 the travel times are precomputed in a 3-dimensional grid at step 6. At step 7 a grid search, least squares solution, or imaging is conducted for most probable event location analysis. The fracture geometry parameters are then calculated from the microseismic event cloud. The output is then used to further modify the hydraulic fracture operation in the stimulated well based on the calculated fracture map. Modifications to the hydraulic fracture operation include but are not limited to adjusting stimulation flow rates, adjusting downhole proppant concentrations, altering subsequent stage stimulation, additional stimulation, spot fracturing, and placement of diverters.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

As described above, embodiments of the present disclosure are particularly useful for determining microseismic event locations and fracture mapping using DAS systems. Accordingly, advantages of the present disclosure include decreased microseismic event location uncertainty, no need for L-shape fiber optics, no need for an additional observation well, no need for multiple fiber optic cables within the well, and reduction of DAS implementation complexity. While the foregoing microseismic monitoring techniques have been described in the contest of hydraulic fracturing, persons of ordinary skill in the art will appreciate that techniques are not limited to fracturing of a wellbore, but may be used for other purposes, such as seismic while drilling, acoustic logging, seismic logging, acoustic ranging, and acoustic triangulation.

Thus, a method of microseismic monitoring about a wellbore has been described. The microseismic monitoring method includes the steps of deploying at least one distributed acoustic sensor in a first well; obtaining initial data from a monitored well; identifying the multiple stratigraphic layers in the subterranean zone surrounding a monitored well; determining the rock-velocity heterogeneity and rock-velocity anisotropy of the rock surrounding the monitored well in the subterranean zone; characterizing the path of the monitored well based on the obtained initial data; collecting initial microseismic data associated with the at least one distributed acoustic sensor; identifying an event that could result in a change in the formation about the monitored well; collecting microseismic data from the first well with the at least one distributed acoustic sensor during the identified event; and calculating a formation map from the locations of the plurality of microseismic events, the formation map calculated based on identified rock-velocity dynamics, irregularities in the first well deviation in computation of acoustic travel times, and a weighted probability density function, where each weighting includes variable weighting in the event-location probability density function. Similarly, a method of hydraulic fracturing has been described. The hydraulic fracturing method includes the steps of deploying at least one distributed acoustic sensor in a first well; obtaining pre-stimulation data from a treatment well to be hydraulically fractured; identifying the multiple stratigraphic layers in the subterranean zone surrounding the treatment well; determining the rock-velocity heterogeneity and rock-velocity anisotropy of the rock surrounding the treatment well in the subterranean zone; characterizing the path of the treatment well based on the obtained pre-stimulation data; collecting pre-stimulation microseismic data associated with the at least one distributed acoustic sensor; fracturing the treatment well by injecting hydraulic fracturing fluid in the treatment well to form a set of fractures; collecting microseismic data from the first well with the at least one distributed acoustic sensor while fracturing the treatment well in a first fracture stimulation stage to form the set of fractures; and calculating a fracture map from the locations of the plurality of microseismic events, the fracture map calculated based on identified rock-velocity dynamics, irregularities in the first well deviation in computation of acoustic travel times, and a weighted probability density function, where each weighting includes variable weighting in the event-location probability density function.

The following elements may be combined alone or in combination with any other elements for any of the foregoing method embodiments:

Utilizing the distributed acoustic sensor to detect and acquire source-locations for one or more microseismic events within a region proximal to said first well.

Utilizing the distributed acoustic sensor to detect and acquire source-locations for one or more microseismic events within a region proximal to said first well and to transmit the source-locations.

Transmitting source-locations to a processor.

Injecting hydraulic fracturing fluid into the monitored well to form a set of fractures in the formation.

The identified event is injecting hydraulic fracturing fluid in the monitored well to form a set of fractures in the formation.

Hydraulically fracturing a well.

Injecting a fluid treatment into a well.

Acidizing a well.

The identified event is deploying equipment in a well.

The identified event is retrieving equipment from a well.

The identified event is shutting in a well.

The treatment well is said first well.

The first well is a second observation well that is offset from the treatment well.

Identification of the stratigraphic layers is determined using priory borehole logs and/or seismic data for the subterranean zone.

Determining the rock-velocity heterogeneity and rock-velocity anisotropy comprises modelling of priory information from borehole log; refining the model using calibration shots and/or selected microseismic events; and simulating annealing where rock parameters are varied according to schedule until an accurate model is found.

Determining, for each said acoustic emission source, a set of 3D positions of a source-location of said acoustic emission source, utilizing the seismic arrival time values from said acoustic emission source detected along said acoustic sensing cable.

Pre-stimulation microseismic data consist of a continuous stream of acoustic data; wherein the streamed acoustic data is analyzed, and time intervals are identified that coincide with microseismic events of interest.

Analyzing pre-stimulation acoustic data to identify time intervals that coincide with microseismic events of interest.

Analyzing pre-identified event acoustic data to identify time intervals that coincide with microseismic events of interest.

Determining, for each said acoustic emission source, a set of 3D positions of a source-location of said acoustic emission source, utilizing the seismic arrival time values from said acoustic emission source detected along said acoustic sensing cable.

Determining, for at least one acoustic emission source, a set of 3D positions of a source-location of said acoustic emission source, utilizing the seismic arrival time values from said acoustic emission source detected along said acoustic sensing cable.

Determining, for a plurality of acoustic emission sources, a set of 3D positions of a source-location of said acoustic emission source, utilizing the seismic arrival time values from said acoustic emission source detected along said acoustic sensing cable.

The arrival time values are one or more of a measured compressional wave (P-wave) arrival times and a measured shear wave (S-wave) arrival times, where said P-wave and said S-waves are at least one of a direct wave, a reflected wave, and a refracted wave emitted by said microseismic emission source.

Adjusting the hydraulic fracturing operation based on the calculated fracture map.

Visually displaying the microseismic event locations on a display.

Visually displaying the calculated fracture map on a display.

Thus, a system for analyzing microseismic data from a subterranean zone has been described. The system includes a first well; a DAS system, located in an observation well, and operable, as part of an acoustic sensing system, to detect and acquire source-locations for one or more microseismic events within a region proximal to said first well, and transmit said source-locations; at least one processor; and a memory coupled to the processor having instructions stored therein, which when executed by the processor, cause the processor to perform functions including functions to calculate a fracture map for the first well from the locations of the plurality of microseismic events, the fracture map calculated based on identified rock-velocity dynamics, irregularities in the first well deviation in computation of acoustic travel times, and a weighted probability density function, where each weighting includes variable weighting in the event-location probability density function. In other embodiments, the system includes a first well; an observation well spaced apart in a formation from the first well; a distributed acoustic sensing system disposed in the observation well; at least one processor; and a memory coupled to the processor and having instructions stored therein, which when executed by the processor, cause the processor to perform functions including functions to calculate a fracture map for the first well from the locations of the plurality of microseismic events, the fracture map calculated based on identified rock-velocity dynamics, irregularities in the first well deviation in computation of acoustic travel times, and a weighted probability density function, where each weighting includes variable weighting in the event-location probability density function. In yet other embodiments, the system includes a first well; an observation well, spaced apart in a formation from the first well; a distributed acoustic sensing system disposed in the observation well; at least one processor; and a memory coupled to the processor and having instructions stored therein, which when executed by the processor, cause the processor to perform functions including calculating a formation map from the locations of the plurality of microseismic events, the formation map calculated based on identified rock-velocity dynamics, irregularities in the first well deviation in computation of acoustic travel times, and a weighted probability density function, where each weighting includes variable weighting in the event-location probability density function. In other embodiments, the system includes a first well; a distributed acoustic sensing system disposed in the first well; at least one processor; and a memory coupled to the processor and having instructions stored therein, which when executed by the processor, cause the processor to perform functions including functions to calculate a fracture map for the first well from the locations of the plurality of microseismic events, the fracture map calculated based on identified rock-velocity dynamics, irregularities in the first well deviation in computation of acoustic travel times, and a weighted probability density function, where each weighting includes variable weighting in the event-location probability density function.

The following elements may be combined alone or in combination with any other elements for any of the foregoing embodiments:

A hydraulic fracturing pump in fluid communication with the well.

A source of hydraulic fracturing fluid in fluid communication with a hydraulic fracturing pump.

A fluid treatment pump in fluid communication with the well.

A source of fluid for treatment of a well.

The distributed acoustic sensor is deployed along a substantial portion of the length of the well in which it is deployed.

The distributed acoustic sensor comprises a cable having a single fiber-optic cable.

The distributed acoustic sensor comprises a cable having a multiple fiber-optic cables.

The distributed acoustic sensor comprises discrete acoustic sensors operable to capture measurements of acoustic emission, and operable to transmit said measurements.

Identification of the stratigraphic layers is determined using priory borehole logs and/or seismic data for the subterranean zone.

Determining the rock-velocity heterogeneity and rock-velocity anisotropy comprises modelling of priory information from borehole log; refining the model using calibration shots and/or selected microseismic events; and simulating annealing where rock parameters are varied according to schedule until an accurate model is found.

Determining, for each said acoustic emission source, a set of 3D positions of a source-location of said acoustic emission source, utilizing the seismic arrival time values from said acoustic emission source detected along said acoustic sensing cable.

Pre-stimulation microseismic data consist of a continuous stream of acoustic data; wherein the streamed acoustic data is analyzed, and time intervals are identified that coincide with microseismic events of interest.

Analyzing pre-stimulation acoustic data to identify time intervals that coincide with microseismic events of interest.

Analyzing pre-identified event acoustic data to identify time intervals that coincide with microseismic events of interest.

Determining, for each said acoustic emission source, a set of 3D positions of a source-location of said acoustic emission source, utilizing the seismic arrival time values from said acoustic emission source detected along said acoustic sensing cable.

Determining, for at least one acoustic emission source, a set of 3D positions of a source-location of said acoustic emission source, utilizing the seismic arrival time values from said acoustic emission source detected along said acoustic sensing cable.

Determining, for a plurality of acoustic emission sources, a set of 3D positions of a source-location of said acoustic emission source, utilizing the seismic arrival time values from said acoustic emission source detected along said acoustic sensing cable.

The arrival time values are one or more of a measured compressional wave (P-wave) arrival times and a measured shear wave (S-wave) arrival times, where said P-wave and said S-waves are at least one of a direct wave, a reflected wave, and a refracted wave emitted by said microseismic emission source.

Adjusting the hydraulic fracturing operation based on the calculated fracture map.

Visually displaying the microseismic event locations on a display.

Visually displaying the calculated fracture map on a display.

While specific details about the above embodiments have been described, the above hardware and software descriptions are intended merely as example embodiments and are not intended to limit the structure or implementation of the disclosed embodiments. For instance, although many other internal components of the system 1000 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the FIG. 13 illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

The invention claimed is:

1. A method of microseismic monitoring comprising:
deploying at least one distributed acoustic sensor (DAS) of a DAS system in a first well to detect and acquire source-locations of one or more microseismic events within a region proximal to a treatment well;
obtaining pre-stimulation data from the treatment well to be hydraulically fractured;
identifying multiple stratigraphic layers in a subterranean zone surrounding the treatment well;
determining rock-velocity heterogeneity and rock-velocity anisotropy of rock surrounding the treatment well in the subterranean zone;
characterizing a path of the treatment well based on the obtained pre-stimulation data;
monitoring pre-stimulation microseismic data associated with the at least one distributed acoustic sensor;
fracturing the treatment well by injecting hydraulic fracturing fluid in the treatment well to form a set of fractures;
monitoring microseismic data from the first well with the at least one distributed acoustic sensor while fracturing the treatment well in a first fracture stimulation stage to form the set of fractures; and
calculating a fracture map from the source-locations, the fracture map calculated based on identified rock-velocity dynamics, irregularities in a first well deviation in computation of acoustic travel times, and a weighted probability density function, where each weighting includes variable weighting in an event-location probability density function.

2. The method of claim 1, wherein a hydraulic fracture operation is adjusted based on the calculated fracture map.

3. The method of claim 1, wherein the treatment well is said first well.

4. The method of claim 1, wherein the first well is a second observation well that is offset from the treatment well.

5. The method of claim 1, wherein identification of the stratigraphic layers is determined using priory borehole logs and/or seismic data for the subterranean zone.

6. The method of claim 1, wherein determining the rock-velocity heterogeneity and the rock-velocity anisotropy consist of:
modelling of priory information from borehole log;
refining the model using calibration shots and/or selected microseismic events; and simulating annealing where rock parameters are varied according to schedule until an accurate model is found.

7. The method of claim 1, wherein the pre-stimulation microseismic data consist of a continuous stream of acoustic data;
wherein the streamed acoustic data is analyzed, and time intervals identified that coincide with microseismic events of interest.

8. The method of claim 1, further comprising determining, for each said source-location, a set of 3D positions of the source-location, utilizing seismic arrival time values from said source-location detected along an acoustic sensing cable of the DAS.

9. The method of claim 8, wherein said arrival time values are one or more of a measured compressional wave (P-wave) arrival times and a measured shear wave (S-wave) arrival times, where said P-wave and said S-waves are at least one of a direct wave, a reflected wave, and a refracted wave emitted by a microseismic emission source.

10. A system for analyzing microseismic data from a subterranean zone the system comprising:
a first well to be hydraulically fractured;
a distributed acoustic sensor (DAS) system, located in an observation well, and operable, as part of an acoustic sensing system, to detect and acquire source-locations for one or more microseismic events within a region proximal to said first well, and transmit said source-locations;
at least one processor; and
a memory coupled to the processor having instructions stored therein, which when executed by the processor, cause the processor to perform functions including functions to:
calculate a fracture map for the first well from the source-locations, the fracture map calculated based on identified rock-velocity dynamics, irregularities in a first well deviation in computation of acoustic travel times, and a weighted probability density function, where each weighting includes variable weighting in an event-location probability density function.

11. The system of claim 10, wherein the observation well is the well to be hydraulically fractured.

12. The system of claim 10, wherein the observation well is second offset well.

13. The system of claim 10, wherein the DAS system includes a cable that consists of a single fiber-optic cable.

14. The system of claim 13 wherein the DAS system cable is comprised of discrete acoustic sensors operable to capture measurements of acoustic emission, and operable to transmit said measurements.

15. The system of claim 10 wherein at least one hydraulic fracturing pump is in fluid communication with a fluid source and the first well to be hydraulically fractured.

16. The system of claim 15, wherein a hydraulic fracturing pump operation is adjusted, via instructions executed by the processor, based on the calculated fracture map.

17. A non-transitory computer-readable storage medium having instructions stored therein, which when executed by a computer cause the computer to perform a plurality of functions, including functions to:
obtain pre-stimulation data from a first well to be hydraulically fractured;
identify multiple stratigraphic layers in a subterranean zone surrounding the first well;
determine rock-velocity heterogeneity and rock-velocity anisotropy of rock surrounding the first well in the subterranean zone;
characterize a first well path based on the obtained pre-stimulation data;
monitor pre-stimulation microseismic data associated with the first well with at least one Distributed Acoustic Sensing (DAS) system deployed in an observation well;
monitor microseismic data from the first well with the at least one DAS system while fracturing the first well is in a first fracture stimulation stage to form a set of fractures;
calculate a fracture map for the first well from a plurality of source-locations, the fracture map calculated based on identified rock-velocity dynamics, irregularities in a first well deviation in computation of acoustic travel times, and a weighted probability density function, where each weighting includes variable weighting in an event-location probability density function.

18. The non-transitory computer-readable storage medium of claim 17, wherein determining the rock-velocity heterogeneity and rock-velocity anisotropy comprises modelling of priory information from borehole log; refining the model using calibration shots and/or selected microseismic events; and simulating annealing where rock parameters are varied according to schedule until an accurate model is found.

19. The non-transitory computer-readable storage medium of claim 17, further comprising determining, for each acoustic emission source, a set of 3D positions of a source-location of said acoustic emission source, utilizing seismic arrival time values from said acoustic emission source detected along an acoustic sensing cable of the DAS.

20. The non-transitory computer-readable storage medium of claim 17, further comprising analyzing pre-identified event acoustic data to identify time intervals that coincide with microseismic events of interest.

* * * * *